(12) United States Patent
Liu et al.

(10) Patent No.: US 11,300,688 B2
(45) Date of Patent: Apr. 12, 2022

(54) PHASE CLOCK PERFORMANCE IMPROVEMENT FOR A SYSTEM EMBEDDED WITH GNSS RECEIVER

(71) Applicant: Ciena Corporation, Hanover, MD (US)

(72) Inventors: Xiaojin Liu, Kanata (CA); Bashar Abdullah, Kanata (CA); Michel Desjardins, Ottawa (CA)

(73) Assignee: Ciena Corporation, Hanover, MD (US)

( * ) Notice: Subject to any disclaimer, the term of this patent is extended or adjusted under 35 U.S.C. 154(b) by 185 days.

(21) Appl. No.: 16/801,315

(22) Filed: Feb. 26, 2020

(65) Prior Publication Data

US 2021/0266086 A1 Aug. 26, 2021

(51) Int. Cl.
*G01S 19/23* (2010.01)
*H04J 3/06* (2006.01)
*G04R 40/02* (2013.01)
*G04R 20/02* (2013.01)

(52) U.S. Cl.
CPC .............. *G01S 19/23* (2013.01); *G04R 40/02* (2013.01); *H04J 3/0644* (2013.01); *H04J 3/0667* (2013.01); *H04J 3/0682* (2013.01); *G04R 20/02* (2013.01)

(58) Field of Classification Search
CPC ......... G01S 19/23; G04R 40/02; H04J 3/0682
USPC .................................................. 342/357.62
See application file for complete search history.

(56) References Cited

U.S. PATENT DOCUMENTS

| | | | |
|---|---|---|---|
| 7,864,817 B2 | 1/2011 | Surek et al. | |
| 8,582,607 B2 | 11/2013 | Surek et al. | |
| 8,630,315 B2 | 1/2014 | Rivaud et al. | |
| 8,953,948 B2 | 2/2015 | Meng et al. | |
| 9,608,755 B2 | 3/2017 | Moynihan | |
| 10,142,730 B1* | 11/2018 | Yousefian | H04R 3/005 |
| 10,355,799 B2 | 7/2019 | Abdullah et al. | |
| 2006/0056563 A1 | 3/2006 | Aweya et al. | |
| 2006/0242445 A1 | 10/2006 | Aweya et al. | |
| 2009/0067844 A1 | 3/2009 | Archambault et al. | |
| 2010/0080210 A1* | 4/2010 | Kim | G06F 1/12 370/350 |
| 2017/0214516 A1 | 7/2017 | Rivaud et al. | |
| 2018/0329069 A1* | 11/2018 | Digrazia | G01S 19/29 |

(Continued)

OTHER PUBLICATIONS

ATIS Standard, ATIS-0900005, GPS Vulnerability, Alliance for Telecommunications Industry Solutions, 2017, pp. 1-23.

*Primary Examiner* — Harry K Liu
(74) *Attorney, Agent, or Firm* — Clements Bernard Baratta; Lawrence A. Baratta, Jr.; Christopher L. Bernard (57) ABSTRACT

Systems and methods of storing phase history, and enhancing and restoring phase accuracy for a embedded Global Navigation Satellite System (GNSS) receiver include storing a phase history of the GNSS receiver output; determining an expected value of phase of the GNSS receiver output based on the phase history; and, responsive to a degradation of the GNSS receiver output, adjusting the GNSS receiver output utilizing the expected value of phase. The systems and method can further include, responsive to degradation being a loss of the GNSS receiver output, utilizing a holdover output from a physical frequency reference and with a phase adjusted based on the expected value of phase, and, responsive to the variation, utilizing the phase history to re-generate the GNSS receiver output for performance enhancement.

16 Claims, 4 Drawing Sheets

(56) References Cited

U.S. PATENT DOCUMENTS

2019/0097711 A1\* 3/2019 Kang ................... H04L 27/2657
2020/0028585 A1 1/2020 Abdullah et al.

\* cited by examiner

PHASE CLOCK PERFORMANCE IMPROVEMENT FOR A SYSTEM EMBEDDED WITH GNSS RECEIVER

FIELD OF THE DISCLOSURE

The Present Disclosure Generally Relates to Clocks in Electrical Circuits. More Particularly, the Present Disclosure Relates to Systems and Methods for Global Navigation Satellite System (GNSS) Receiver Phase Clock Performance Built in within the System

BACKGROUND OF THE DISCLOSURE

GNSS is a satellite navigation system having global coverage. Examples of GNSS include, without limitation, the United States' Global Positioning System (GPS) and Russia's Global Navigation Satellite System (GLONASS) each is fully operational, with China's BeiDou Navigation Satellite System (BDS) and the European Union's Galileo, all of them are being rolled out. Such systems provide various applications, including a precision time reference. That is, such systems can deliver an accurate timing reference for various applications, including network timing synchronization. For example, the Alliance for Telecommunications Industry Solutions (ATIS) published ATIS-0900005. ATIS Technical Report on GPS Vulnerability, 2017, the contents of which are incorporated herein by reference. ATIS-0900005 describes vulnerabilities with respect to GPS and telecom timing. Specifically, there are various vulnerabilities such as environmental issues, jamming, spoofing, GPS errors, etc. that can contribute to GPS timing signal degradation.

With today's GNSS receiver technology, when environment changes (such as temperature variation from system), an impairment or signal loss is experienced, the receiver's output performance degrades and continues to do so in the absence of any assistance. The degradation of a receiver's output impacts the applications that depend on its position and clock source. The applications span multiple industries, such as telecom, aviation, and military, among others. There are industry attempts to mitigate impairments, but those techniques are not widely deployed or require new products. These options come at a high deployment cost.

For fixed GNSS receivers, there is no known technique for recovering the stable, steady-state phase clock by the its own system without assistenace from external clock source. Phase Lock Loops (PLLs) today widely use the history of the frequency clock to maintain the frequency only clock holdover quality and have proven to be effective. However, there is no known solution to address the phase holdover of a GNSS receiver, when the GNSS receiver signal is lost or degraded. Therefore, there is no known technique applied to maintain a phase clock or to adjust the phase clock based on historical information in existing GNSS receivers or systems embodying a GNSS receiver without additional external phase clock source or extremely expensive atomaic clock

BRIEF SUMMARY OF THE DISCLOSURE

The present disclosure relates to systems and methods for Global Navigation Satellite System (GNSS) receiver phase clock performance in two aspects. The first aspect is for enhancement of holdover performance. Specifically, the present disclosure includes a circuit, an apparatus, and a method for maintaining a history of a GNSS receiver phase clock and restoring phase accuracy based on state prior to a degradation. The present disclosure applies to stationary GNSS receivers. The present disclosure provides a process to maintain the history of the GNSS receiver phase clock. The phase history from the GNSS receiver can be maintained by the classification of time interval windows over a defined duration of time. For example, a GNSS receiver's position and time can be maintained for a period of 2 hours, 1 hour, 30 minutes, 10 minutes, and 1 minute prior to the receiver experiencing signal loss or signal degradation. The phase history from the GNSS receiver can also be maintained by classification of the number of visible satellites (e.g., 7, 6, 5, 4, 3, 2, 1 visible satellites). Further, the present disclosure also provides a process that can restore phase accuracy in holdover. When the GNSS receiver signal degrades to a threshold that is unusable as a result of events such as jamming, lost satellites, loss of signals, the best accuracy history of phase data can be used, and the delta from last value can be calculated. This newly calculated value is used to re-generate the stable, steady-state phase clock output. The higher the number of satellite information and duration of historical data collected, the more accurate the adjustment of the phase clock can be.

A second aspect is for the enhancement of the clock performance under variation of environment while still in lock state. Under a variable environment, specially under variable temperature circumstance, the GNSS receiver is locked and everything work normally, but the output can vary vastly and quite often it can have the 1 pps output (phase clock) out of specification for some applications. With the historical data being used, the output can be alternated and improved during the lock state to improve the performance. In an embodiment, the present disclosure can be utilized in a mobile network, for example, in a network element. The present disclosure allows mobility operators to maintain the utilization of their radio spectrum most efficiently. A significant mobility spectrum efficiency factor is inaccurate clock synchronization among clusters of coordinated radios. As 5G mobility services require more stringent phase synchronization (e.g., relative to 3 GPP, which requires 65 ns between adjacent radios delivering Multiple-Input and Multiple-Output (MIMO) or Transmitter Diversity applications), the source of the phase clock becomes increasingly more critical for making efficient use of their spectrum. Delivering a more accurate phase clock, even in the conditions of GNSS receiver impairments, is critical. The present disclosure reduces the time and phase error for devices to meet a more stringent clock class level or meet the stringent requirement of the customers.

In an embodiment, a method of storing phase history, and enhancing and restoring phase accuracy in a fixed Global Navigation Satellite System (GNSS) receiver output includes storing a phase history of the GNSS receiver output; determining an expected value of phase of the GNSS receiver output based on the phase history; and, responsive to any of a variation and degradation of the GNSS receiver output, adjusting the GNSS receiver output utilizing the expected value of phase. Responsive to the degradation being a loss of the GNSS receiver output, the adjusting can include utilizing a holdover output from a physical frequency reference and with a phase adjusted based on the expected value of phase; and, responsive to the variation, the adjusting can include utilizing the phase history to re-generate the GNSS receiver output for performance enhancement. The physical frequency reference can be any of a Synchronous Ethernet (SyncE) interface, a Precision Time Protocol (PTP) interface, a Building Integrated Timing Supply (BITS) clock, and an unbalanced physical interface having a frequency of about 10 Mhz and that is traceable to a Primary Reference Clock (PRC). Prior to the storing, the method can include receiving the GNSS receiver output, and the storing can include storing a previous GNSS receiver output. The storing and the receiving can be via a circuit including any of a Field Programmable Gate Array (FPGA) and a Phase Lock Loop (PLL). The phase history can include a time value and one or more of a number of satellites, a position of the satellites, and a time interval. The expected value of phase can be an average value based on a number of satellites.

In another embodiment, an apparatus is connected to a fixed Global Navigation Satellite System (GNSS) receiver system. The apparatus includes circuitry configured to store a phase history of the GNSS receiver output, determine an expected value of phase of the GNSS receiver output based on the phase history, and adjust the GNSS receiver output utilizing the expected value of phase, responsive to any of a variation and degradation of the GNSS receiver output. The circuitry can be configured to use the phase history to enhance the GNSS receiver output responsive to the variation of GNSS receiver output while still in a lock state. The circuitry can be configured to provide a holdover output from a physical frequency reference and with a phase adjusted based on the expected value of phase, responsive to the degradation being a loss of the GNSS receiver output. The physical frequency reference can be any of a Synchronous Ethernet (SyncE) interface, a Precision Time Protocol (PTP) interface, a Building Integrated Timing Supply (BITS) clock, and an unbalanced physical interface having a frequency of about 10 Mhz and that is traceable to a Primary Reference Clock (PRC). The circuitry can be configured to receive the GNSS receiver output prior to the phase history being stored, and the phase history that is stored includes a previous GNSS receiver output. The circuitry can include any of a Field Programmable Gate Array (FPGA) and a Phase Lock Loop (PLL). The phase history can include a time value and one or more of a number of satellites, a position of the satellites, and a time interval. The expected value of phase can be an average value based on a number of satellites.

In a further embodiment, a fixed Global Navigation Satellite System (GNSS) receiver system includes a GNSS receiver connected to an antenna and configured to output a pulse at a predetermined frequency; and circuitry configured to store a phase history of the output of the GNSS receiver, determine an expected value of phase of the GNSS receiver based on the phase history, and, responsive to any of a variation and degradation of the GNSS receiver output, adjust the output of the GNSS receiver utilizing the expected value of phase. The fixed GNSS receiver system can further include a physical frequency reference that is traceable to a Primary Reference Clock (PRC) or higher accuracy frequency clock, wherein the circuitry is configured to responsive to the variation of the GNSS receiver output, utilize the phase history to re-generate the GNSS receiver output for performance enhancement, and, responsive to the degradation being a loss of the GNSS receiver output, utilize a holdover output from the physical frequency reference and with a phase adjusted based on the expected value of phase. The circuitry can be configured to receive the GNSS receiver output, and store a previous GNSS receiver output. The circuitry can include any of a Field Programmable Gate Array (FPGA) and a Phase Lock Loop (PLL). The phase history can include a time value and one or more of a number of satellites, a position of the satellites, and a time interval.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Global Navigation Satellite System (GNSS) receiver phase clock performance. Specifically, the present disclosure includes a circuit, an apparatus, and a method for maintaining a history of a GNSS receiver phase clock and enhancing or restoring phase accuracy based on state prior to a degradation. The present disclosure applies to stationary GNSS receivers. The present disclosure provides a process to maintain the history of the GNSS receiver phase clock. The phase history from the GNSS receiver can be maintained by the classification of time interval windows over a defined duration of time. For example, a GNSS receiver's position and time can be maintained for a period of 2 hours, 1 hour, 30 minutes, 10 minutes, and 1 minute prior to the receiver experiencing signal loss or signal degradation. The phase history from the GNSS receiver can also be maintained by classification of the number of visible satellites (e.g., 7, 6, 5, 4, 3, 2, 1 visible satellites). Futher, the present disclosure also provides a process to enhance the phase accuracy in lock state. Furthermore, the present disclosure also provides a process that can restore phase accuracy in holdover. When the GNSS receiver signal degrades to a threshold that is unusable as a result of events such as jamming, lost satellites, loss of signals, the best accuracy history of phase data can be used, and the delta from last value can be calculated. This newly calculated value is used to re-generate the stable, steady-state phase clock output. The higher the number of satellite information and duration of historical data collected, the more accurate the adjustment of the phase clock can be.

A second aspect is for the enhancement of the clock performance under variation of environment. Under a variable environment, specially under variable temperature circumstance, the GNSS receiver is locked and everything work normally, but the output can vary vastly and quite often it can have the 1 pps output (phase clock) out of specification for some applications. With the historical data being used, the output can be alternated and improved during the lock state and therefore greatly improve the performance. Still using a SyncE/10 Mhz/BITS physical clock that is traceable to a Primary Reference Clock (PRC) to do the measurement and history data being kept as above, the present disclosure includes adjusting the output by using some process and generating the output, instead of a 1 pps pass through. The new modified output data is also stored and used i the next output; for the input x[i], without adjustment in the lock state, the input is simply passing through, so the output y[i]=x[i]; with the historical original x[i], the enhanced output can be re-generated by filtering or other mathematical algorithm. The simple example is a moving average.

$$y[i] = \frac{1}{M} \sum_{j=0}^{M-1} x[i+j]$$

In an embodiment, the present disclosure can be utilized in a mobile network, for example, in a network element. The present disclosure allows mobility operators to maintain the utilization of their radio spectrum most efficiently. A significant mobility spectrum efficiency factor is inaccurate clock synchronization among clusters of coordinated radios. As 5G mobility services require more stringent phase synchronization (e.g., relative to 3GPP, which requires 65 ns between adjacent radios delivering Multiple-Input and Multiple-Output (MIMO) or Transmitter Diversity applications), the source of the phase clock becomes increasingly more critical for making efficient use of their spectrum. Delivering a more accurate phase clock, even in the conditions of GNSS receiver impairments is critical. The present disclosure reduces the time and phase error for devices to meet a more stringent clock class level or meet the stringent requirement of the customers.

A GNSS system includes a plurality of satellites in a constellation. GPS is one type of GNSS system, and those skilled in the art will appreciate other GNSS systems are also contemplated with the systems and methods described herein. The GPS system currently includes 31 satellites in a constellation. The satellites in the constellation are synchronized via an atomic clock. GPS can provide a timing reference via a one Pulse-Per-Second (1 pps) and Coordinated Universal Time (UTC) reference. As this pulse is locked to the atomic-time-based GPS signals, it has very good long-term stability but can provide poor short-term stability due to environmental, atmospheric, and other effects.

For time clocks, GNSS receivers calculate their fixed 3-Dimensional (3D) position and derive their highly accurate time clocks therefrom. The 3D position is based on measuring the latency of signals from visible satellites in a constellation. Each satellite transmits its ephemeris (i.e., the exact position in orbit), its health relative to other satellites, and, most importantly, the time its signal was transmitted. Most GNSS receivers require a minimum of 4 satellites for a more accurate position calculation. The calculation uses triangulation based on the satellite positions and the time it takes for the speed of light to reach the GNSS receiver. This information can then be used to identify the intersection point of the satellite signals. A 2D position can be derived from 3 satellites, the height then requires a 4th satellite to identify the 3D position. A time clock requires a 3D position to be identified in order to derive a highly accurate clock. The more samples, and thus triangles, available to calculate the intersection point created by the satellite signals, the more accurate the 3D position. This method of triangulation is the only method used by fixed GNSS receivers to identify their exact position and to derive their time clock.

Figure 1:
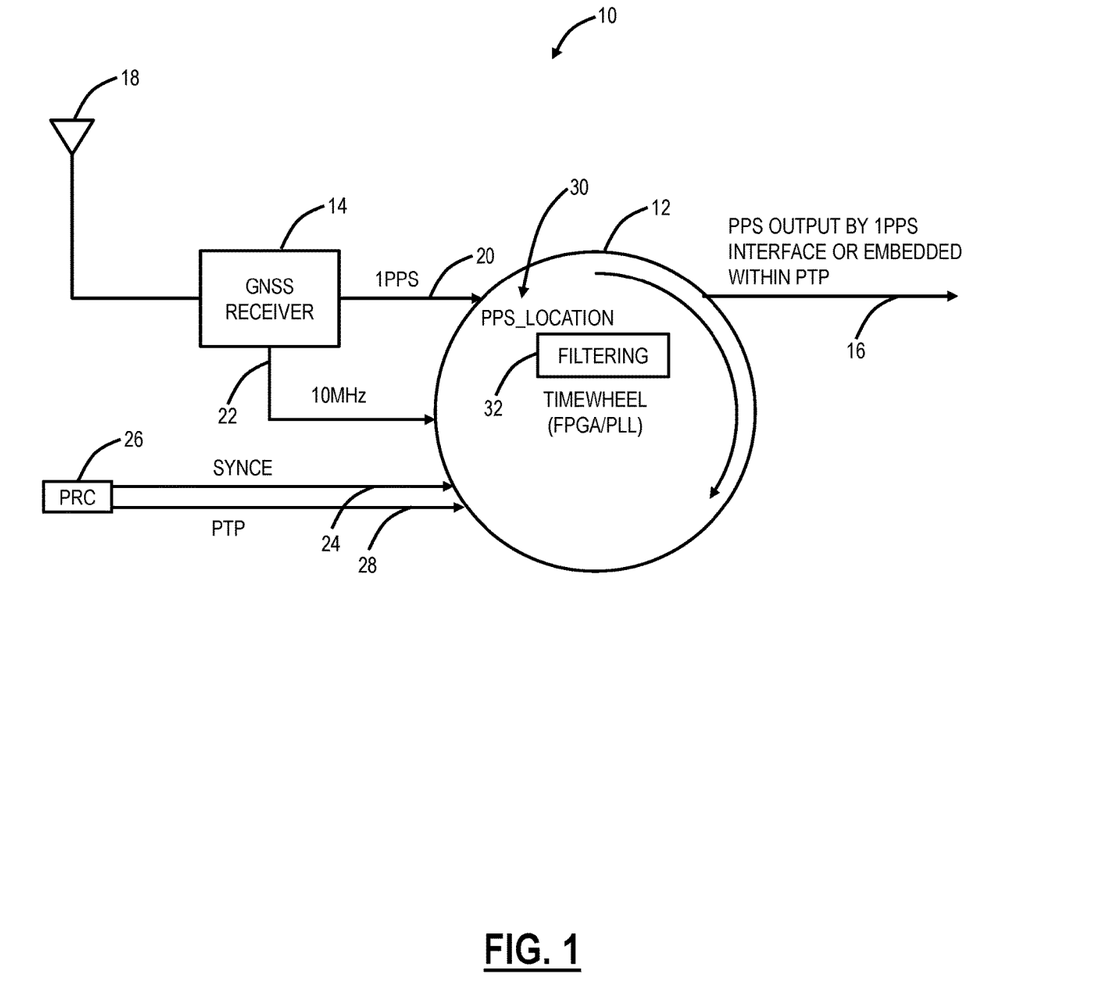
FIG. 1 is a diagram of a GNSS receiver system including a timewheel circuit connected to a GNSS receiver.
Figure 2:
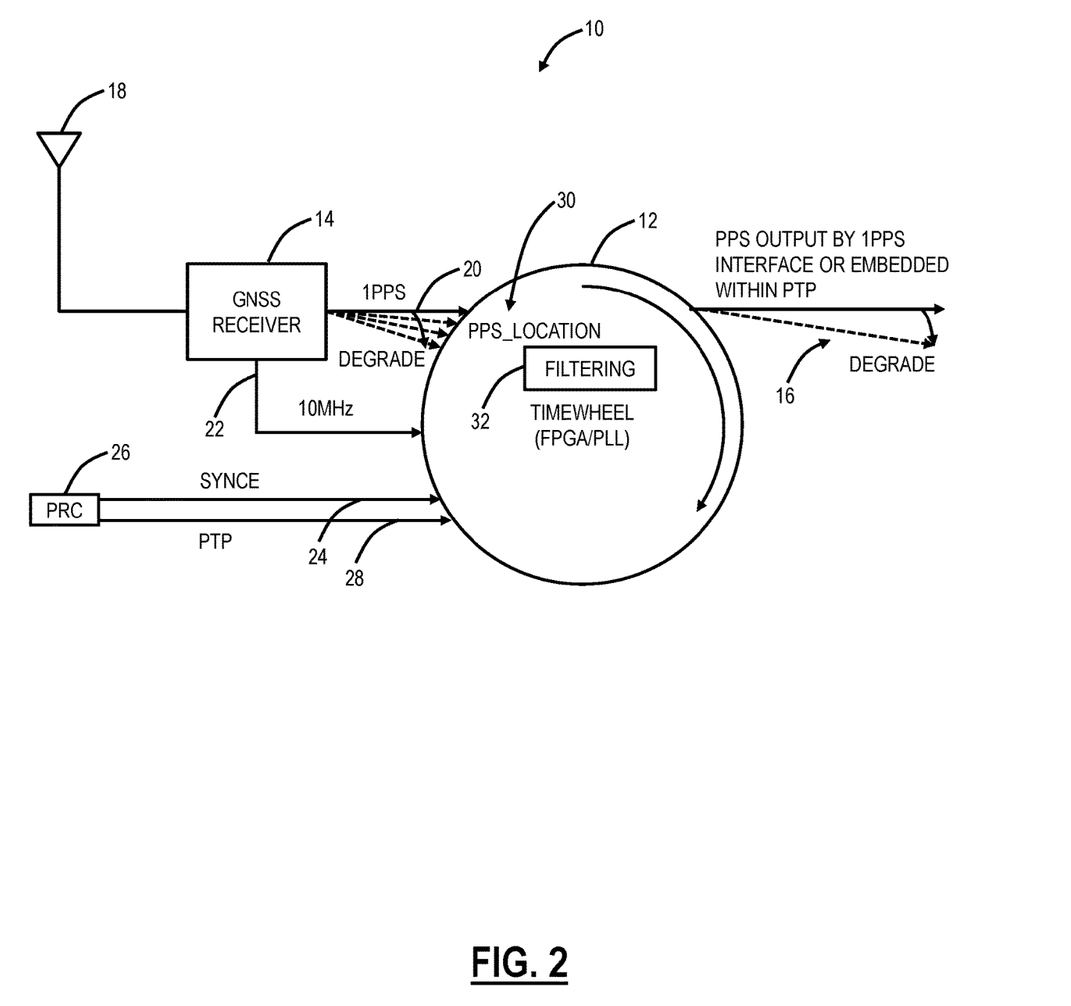
FIG. 2 is a diagram of the GNSS receiver system of FIG. 1 illustrating degradation in the GNSS receiver leading to a degraded output of the timewheel circuit.
Figure 3:
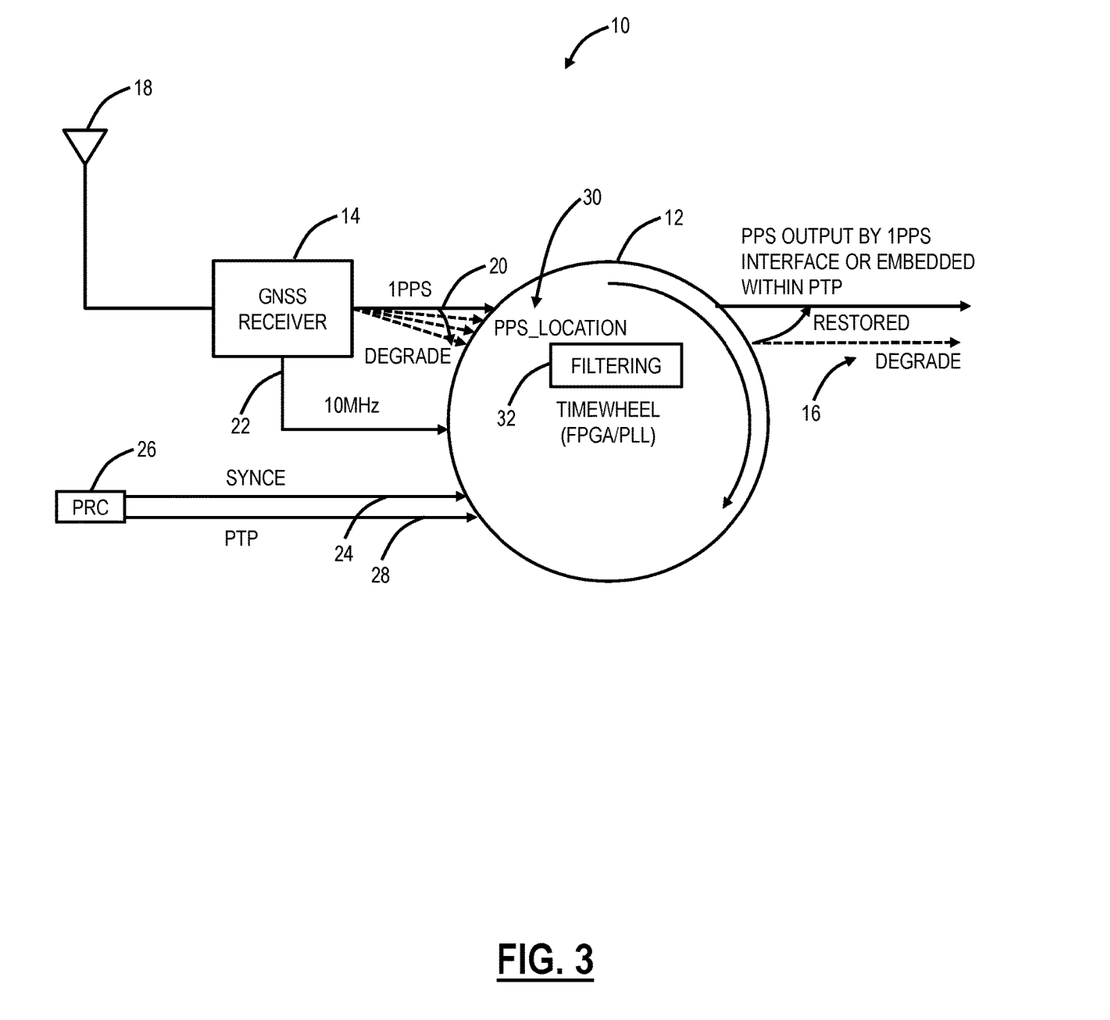
FIG. 3 is a diagram of the GNSS receiver system of FIGS. 1 and 2 illustrating degradation in the GNSS receiver and restoration of an output via the timewheel circuit.

FIG. 1 is a diagram of a GNSS receiver system 10, including a timewheel circuit 12 connected to a GNSS receiver 14. FIG. 2 is a diagram of the GNSS receiver system 10, illustrating degradation in the GNSS receiver 14, leading to a degraded output of the timewheel circuit 12. FIG. 3 is a diagram of the GNSS receiver system 10, illustrating degradation in the GNSS receiver 14 and restoration of an output 16 via the timewheel circuit 12. The GNSS receiver 14 includes an antenna 18 that is configured to receive signals from one or more satellites in a constellation. Based on the received signals, the GNSS receiver 14 is configured to output a 1 pps signal 20 and an optional 10 MHz signal 22 to the timewheel circuit 12. Note, the accuracy of the 1 pps signal 20 and the optional 10 MHz signal 22 is impacted by various factors (received signals from the satellites at the antenna 18).

The timewheel circuit 12 is a circuit, such as a Field Programmable Gate Array (FPGA), Phase Lock Loop (PLL), etc. that is configured to maintain a history of the 1 pps signal 20 from the GNSS receiver 14, enhance and restore phase accuracy on the output 16 from degradation of the 1 pps signal 20. The timewheel circuit 12 can be driven by a clock from a Synchronous Ethernet (SyncE) interface 24 or the like that is traceable to a Primary Reference Clock (PRC) 26. Also, in addition to a SyncE interface 24, the timewheel circuit 12 could be driven by a Building Integrated Timing Supply (BITS) clock. The timewheel circuit 12 can be viewed as a "timewheel" that moves, based on the PRC 26. Also, the timewheel circuit 12 could be driven by a Precision Time Protocol (PTP) interface 28, or the like. In an embodiment, the timewheel circuit 12 can wrap every one second and can range from 0 to 999,999,999 ns (nanoseconds), thereby having a nanosecond granularity.

FIG. 1 illustrates a normal condition where the 1 pps signal 20 from the GNSS receiver 14 is stable. Normally, the 10 MHz signal 22 is used together with the 1 pps signal 20, both having the same accuracy, based on the GNSS receiver 14. The 1 pps signal 20 connects to the timewheel circuit 12, which includes a pps_location 30 noting the location of the 1 pps signal 20, e.g., in nanosecond granularity. When the GNSS receiver 14 is lost or degraded, the pps_location on the timewheel circuit 12 can be used to regenerate the 1 pps phase. Specifically, the 1 pps signal 20 output from the GNSS receiver 14 is latched in the timewheel circuit 12. That is, the pps_location 30 is a current value when the 1 pps signal 20 is received, stored in nanoseconds. Ideally, the pps_location 30 is fixed and never changes if the GNS receiver 14 accuracy is perfect. Of course, practically, this does not occur, and the value varies over time.

When the GNSS receiver 14 is stable (e.g., such as when it has the same set of satellite positioning), it will have a 1 pps signal 20, and therefore the pps_location 30 is stable and fluctuates with its ±accuracy. In FIG. 2, when the GNSS receiver 14 signal degrades (e.g., such as positioning satellites dropping), the accuracy of the 1 pps signal 20 will also degrade and so the pps_location 30 will move. Note, FIG. 2 illustrates a degradation in the 1 pps signal 20 due to the GNSS receiver 14 and a corresponding degradation on the output 16 of the timewheel circuit 12.

When the GNSS receiver 14 loses its signals and is degraded, the SyncE interface 24 can be used to support the phase output and keep stability temporarily (e.g., 24 hours), or can be transient to the PTP interface 28 as a backup. Without any history, the last pps_location 30 is solely used, generating significant time error. The present disclosure includes a history of the phase output on the 1 pps signal 20 to restore the phase output on the output 16 when the 1 pps signal 20 is degraded or lost. With the history, a restored good accuracy pps_location 30 can be used to improve the performance of the phase, as illustrated in FIG. 3.

The timewheel circuit 12 can include memory to maintain the pps_location 30 from the GNSS receiver 14 over time. That is, the timewheel circuit 12 can maintain a phase history of the 1 pps signal 20 from the GNSS receiver 14. This history can include the pps_location 30, the number of satellites, and/or a history interval (time interval). For example, the numbers of satellites can be an integer value. The history interval can be 30 minutes, 20 minutes, 10 minutes, 5 minutes, 30 seconds, 10 seconds, 5 seconds, etc. The memory includes the phase value (e.g., in nanoseconds), prior to GNSS receiver 14 signal loss and degrade, and the memory can further include the number of satellites for that phase value and/or the time interval for that value.

In one embodiment, the history of the phase value is maintained at regular intervals for a duration of time, such as 3 hours, 1 hour, 10 mins, and so on. In another embodiment, the history of the phase value is maintained based on the number of visible satellites, such as 12 satellites, 11, 10, and so on. In a further embodiment, the history of the phase value is maintained based on both the regular intervals for a duration of time and the number of visible satellites. Still, in yet a further embodiment, the memory can include additional information such as satellite status, position, etc.

Again, the information stored in the memory is from the stable, steady-state of the GNSS receiver 14. The information stored includes the pps_location 30 and the visible satellite positions. This information may be stored at regular intervals for a defined duration of time. When the GNSS receiver 14 is operational, the 1 pps signal 20 from the GNSS receiver 14 is latched by the timewheel circuit 12 that is implemented, for example, in an FPGA or PLL. The value can be stored in a hardware register and can be overwritten at every 1 pps signal. Before the next 1 pps pulse output, software or hardware may be used to retrieve the latched 1 pps value (in nanoseconds) from the hardware 1 pps register. The software or hardware may then store this piece of information in a history bin (memory), along with the number and/or position of the satellites contributing to the 1 pps pulse.

The memory can be used to enhance and improve the phase accuracy. The latched 1 pps value from hardware 1 pps register combined with history data can be applied to filter 32 and regenerate the output 1 pps signal 16. For example, with the history data, the output 1 pps signal 16 can be re-generated by filtering 32 (using various mathematical techniques to smooth out the variation of the output during lock state). For example, the low pass filter or moving average can be used.

The memory can be used to restore phase accuracy. For example, the most accurate historical data can be selected by an algorithm (such as by the most number of satellites and longest durations) and the delta of the phase from the historical average with the last position being calculated. The calculated delta to reconfigure the current position has the effect of restoring the accuracy of the phase clock. It can then used to re-generate the phase clock output, representing the stable, steady-state clock accuracy during a holdover condition. This introduces a technique for storing historical GNSS receiver information and compensating the phase clock for any receiver impairments.

The GNSS receiver system 10 can include software and/or hardware for processing data. The software and/or hardware can compute an average of the 1 pps value stored for each category. For example, for the category of 7 satellites, the average 1 pps signal 20 can be 0.999999995 seconds, for 6 satellites, the average 1 pps signal 20 can be 0.999999983 seconds, and for 5 satellites, the average 1 pps signal can be 0.999999972 seconds, and so on. The satellite information and state can be known by the software or hardware based on the GNSS receiver status messages. The latched 1 pps value (pps_location 30) can be correlated with the status and positions of the satellites.

Based on the average 1 pps value, the category of the highest number of visible satellites can be used to calculate the differential between the current 1 pps signal 20 output and the average 1 pps value. This differential can then be applied to the current 1 pps signal 20 value, to move the output 16 back into the original stable, steady-state phase clock output. The 1 pps pulse is operated based on a timewheel that is driven by a physical frequency reference, such as a BITS, SyncE, or another 10 MHz clock reference that is traceable to the PRC.

Also, the memory can include various historical values of the phase, the number of satellites, satellite position, etc. The software and/or hardware for processing data in the GNSS receiver system 10 can implement various Artificial Intelligence (AI) and/or Machine Learning (ML) techniques on the historical data for various purposes such as trending, fault detection, proactive determination of degradation, etc. The outputs of such techniques can be used to restore the phase in the output 16. The outputs can also be used to provide alarming or notifications of events, trends, predictions, etc.

In operation, assume a GNSS receiver 14 has visibility to at least 4 satellites in a single constellation, via the antenna 18. Once the GNSS receiver 14 has completed its startup procedure and has an exact time clock, the phase clock output (i.e., 1 pps) of the GNSS receiver is latched in the timewheel circuit 12 at the pps_location 30, at a nanosecond level accuracy. Assume, the antenna 18 becomes impaired to create a GNSS degrade condition. With the present disclosure, the phase clock output 16 will experience a very short or no shift or offset at all, from its stable, steady-state, nor will it experience drift over a few hours of observation.

Figure 4:
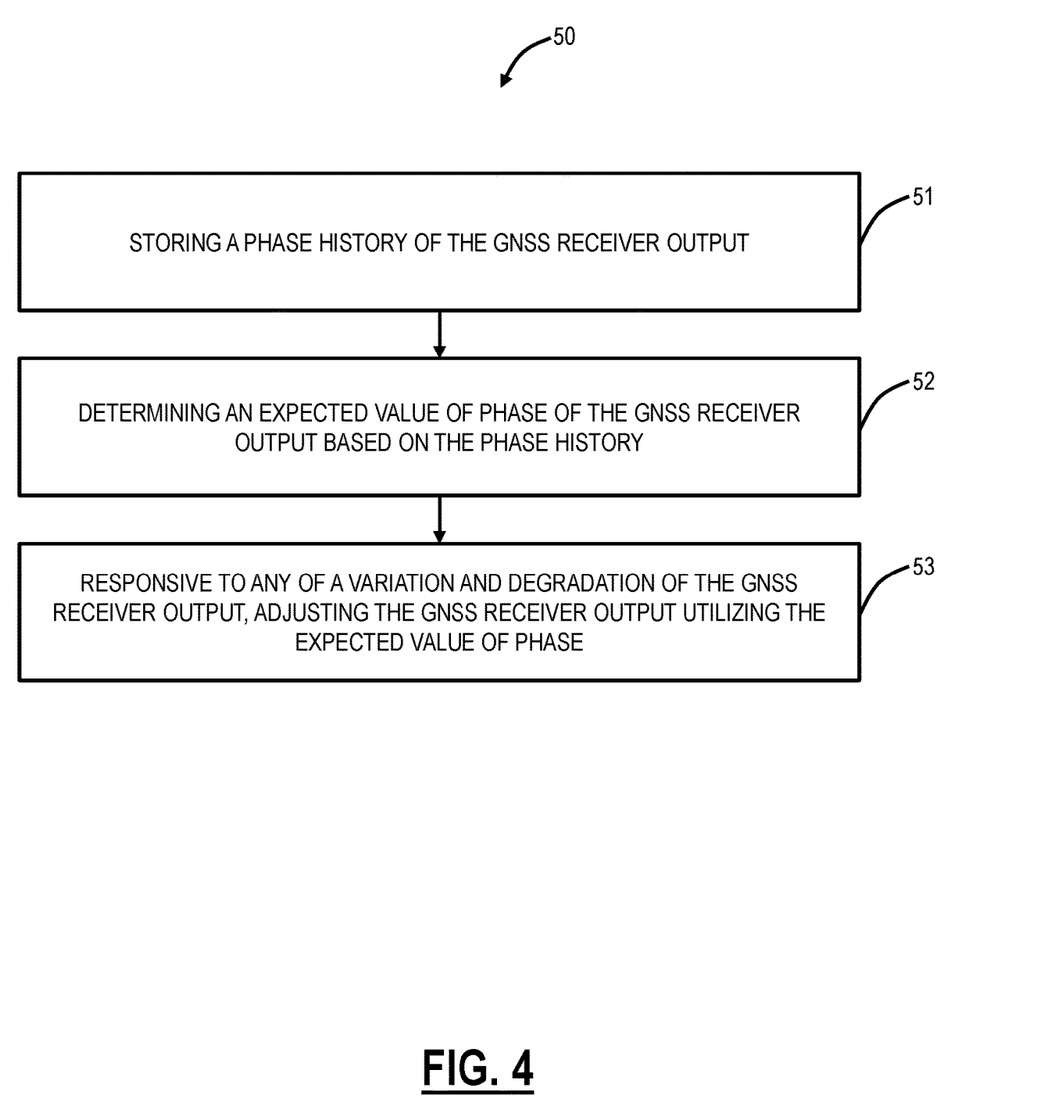
FIG. 4 is a flowchart of a process of storing phase history and enhancing (in lock state) or restoring phase accuracy in holdover state in a Global Navigation Satellite System (GNSS) receiver output.

The core of this disclosure is to maintain the history data and reapply the best history data during lock or holdover state. This is the only way to maintain the accuracy of the phase output when the GNSS receiver 14 lost or degraded without linking to external differential GNSS data/signal for correction FIG. 4 is a flowchart of a process 50 of storing phase history and restoring phase accuracy in a Global Navigation Satellite System (GNSS) receiver output. The process 50 includes storing a phase history of the GNSS receiver output (step 51); determining an expected value of phase of the GNSS receiver output based on the phase history (step 52); and, responsive to any of a variation and degradation of the GNSS receiver output, adjusting the GNSS receiver output utilizing the expected value of phase (step 53).

Responsive to the degradation being a loss of the GNSS receiver output, the adjusting can include utilizing a holdover output from a physical frequency reference and with a phase adjusted based on the expected value of phase. Responsive to the variation, the adjusting can include utilizing the phase history to re-generate the GNSS receiver output for performance enhancement. The physical frequency reference can be any of a Synchronous Ethernet (SyncE) interface, a Precision Time Protocol (PTP) interface, and a Business Integrated Timing Supply (BITS) clock.

The GNSS receiver output can be received prior to the storing, and the storing includes storing a previous GNSS receiver output. The storing and the receiving can be via a circuit, including any of a Field Programmable Gate Array (FPGA) and a Phase Lock Loop (PLL). The phase history can include a time value and one or more of a number of satellites, a position of the satellites, and a time interval. The expected value of the phase can be an average value based on a number of satellites.

In another embodiment, an apparatus connected to a fixed Global Navigation Satellite System (GNSS) receiver system includes circuitry configured to store a phase history of the GNSS receiver output; circuitry configured to determine an expected value of phase of the GNSS receiver output based on the phase history; and circuitry configured to adjust the GNSS receiver output utilizing the expected value of phase, responsive to a degradation of the GNSS receiver output.

In a further embodiment, a fixed Global Navigation Satellite System (GNSS) receiver system includes a GNSS receiver connected to an antenna and configured to output a pulse at a predetermined frequency; and a circuit configured to store a phase history of the output of the GNSS receiver, determine an expected value of phase of the GNSS receiver based on the phase history, and, responsive to a degradation of the GNSS receiver output, adjust the output of the GNSS receiver utilizing the expected value of phase.

The present disclosure contemplates implementation in an FPGA, a PLL, in an ASIC, or any other circuit implementation. Further, the present disclosure also contemplates implementation in software executed by a processor, controller, or any other type of circuit. Also, it will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments. Further, the term "circuitry configured to" can include one or more integrated circuits as well as a separate processor, separate memory, etc. In an embodiment, the term "circuitry configured to" can include a single integrated circuit with processing logic and with integrated memory. In another embodiment, the term "circuitry configured to" can include a plurality of integrated circuits connected to one another as well as external memory, etc. Those of ordinary skill in the art will recognize the term circuitry contemplates all of these implementations, namely the term circuitry can be the same or different circuitry performing the various functions described herein.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of storing phase history, and enhancing and restoring phase accuracy in a fixed Global Navigation Satellite System (GNSS) receiver output, the method comprising:
storing a phase history of the GNSS receiver output;
determining an expected value of phase of the GNSS receiver output based on the phase history;
responsive to a variation and/or degradation of the GNSS receiver output, adjusting the GNSS receiver output utilizing the expected value of phase; and
responsive to the degradation being a loss of the GNSS receiver output, the adjusting includes utilizing a holdover output from a physical frequency reference and with a phase adjusted based on the expected value of phase, wherein the physical frequency reference is any of a Synchronous Ethernet (SyncE) interface, a Precision Time Protocol (PTP) interface, a Building Integrated Timing Supply (BITS) clock, and an unbalanced physical interface having a frequency of about 10 Mhz and that is traceable to a Primary Reference Clock (PRC).

2. The method of claim 1, wherein
responsive to the variation, the adjusting includes utilizing the phase history to regenerate the GNSS receiver output for performance enhancement.

3. The method of claim 1, wherein, prior to the storing, the method includes receiving the GNSS receiver output, and the storing includes storing a previous GNSS receiver output.

4. The method of claim 3, wherein the storing and the receiving is via a circuit including any of a Field Programmable Gate Array (FPGA) and a Phase Lock Loop (PLL).

5. The method of claim 1, wherein the phase history includes a time value and one or more of a number of satellites, a position of the satellites, and a time interval.

6. The method of claim 1, wherein the expected value of phase is an average value based on a number of satellites.

7. An apparatus connected to a fixed Global Navigation Satellite System (GNSS) receiver system, the apparatus comprising circuitry configured to:
store a phase history of the GNSS receiver output, determine an expected value of phase of the GNSS receiver output based on the phase history, adjust the GNSS receiver output utilizing the expected value of phase, responsive to a variation and/or degradation of the GNSS receiver output; and provide a holdover output from a physical frequency reference and with a phase adjusted based on the expected value of phase, responsive to the degradation being a loss of the GNSS receiver output, wherein the physical frequency reference is any of a Synchronous Ethernet (SyncE) Interface, a Precision Time Protocol (PTP) interface, a Building Integrated Timing Supply (BITS) clock, and an unbalanced physical interface having a frequency of about 10 Mhz and that is traceable to a Primary Reference Clock (PRC).

8. The apparatus of claim 7, wherein the circuitry is configured to use the phase history to enhance the GNSS receiver output responsive to the variation of GNSS receiver output while still in a lock state.

9. The apparatus of claim 7, wherein the circuitry is configured to receive the GNSS receiver output prior to the phase history being stored, and the phase history that is stored includes a previous GNSS receiver output.

10. The apparatus of claim 9, wherein the circuitry includes any of a Field Programmable Gate Array (FPGA) and a Phase Lock Loop (PLL).

11. The apparatus of claim 7, wherein the phase history includes a time value and one or more of a number of satellites, a position of the satellites, and a time interval.

12. The apparatus of claim 7, wherein the expected value of phase is an average value based on a number of satellites.

13. A fixed Global Navigation Satellite System (GNSS) receiver system comprising:

a GNSS receiver connected to an antenna and configured to output a pulse at a predetermined frequency;

circuitry configured to store a phase history of the output of the GNSS receiver, determine an expected value of phase of the GNSS receiver based on the phase history, responsive to a variation and/or degradation of the GNSS receiver output, adjust the output of the GNSS receiver utilizing the expected value of phase; and a physical frequency reference that is traceable to a Primary Reference Clock (PRC) or higher accuracy frequency clock, wherein the circuitry is configured to responsive to the variation of the GNSS receiver output, utilize the phase history to re-generate the GNSS receiver output for performance enhancement, and responsive to the degradation being a loss of the GNSS receiver output, utilize a holdover output from the physical frequency reference and with a phase adjusted based on the expected value of phase.

14. The fixed GNSS receiver system of claim 13, wherein the circuitry is configured to receive the GNSS receiver output, and store a previous GNSS receiver output.

15. The fixed GNSS receiver system of claim 13, wherein the circuitry includes any of a Field Programmable Gate Array (FPGA) and a Phase Lock Loop (PLL).

16. The fixed GNSS receiver system of claim 13, wherein the phase history includes a time value and one or more of a number of satellites, a position of the satellites, and a time interval.

\* \* \* \* \*